United States Patent Office 3,065,284
Patented Nov. 20, 1962

3,065,284
ISOMERIZATION OF NORMAL PARAFFINS
Marcellus J. Geerts, Evanston, Ill., assignor to The Pure Oil Company, Chicago, Ill., a corporation of Ohio
No Drawing. Filed Dec. 8, 1959, Ser. No. 858,013
8 Claims. (Cl. 260—683.65)

This invention relates to new and useful improvements in processes for the isomerization of low-molecular-weight normal paraffin hydrocarbons, such as n-pentane and n-hexane, and more particularly, to an improved isomerization catalyst and method of preparing the same.

It has been found that the isomerization of n-hexane and n-pentane can be efficiently carried out by passing those hydrocarbons in admixture with hydrogen over a catalyst under moderate-temperature, isomerization conditions. When hexane or pentane is isomerized in this manner, a mixture of hydrogen and the hydrocarbon in a hydrogen/hydrocarbon mol ratio in the range from about 0.5 to 5.0 (preferably about 2.0 to 3.5) is passed over a composite refractory catalyst (prepared and activated in accordance with this invention) at a pressure within the range of about 100–1000 p.s.i.g. (preferably about 500–650 p.s.i.g.) and a temperature within the range of about 650°–800° F. (preferably about 700°–790° F.). The most effective composite catalyst for the isomerization of normal paraffin hydrocarbons under these conditions consists of an acidic silica-alumina support (containing 70–90% silica) having deposited thereon about 0.01–1.0% wt. of palladium. In accordance with this invention, it has been found that the treatment of the silica-alumina support with a compound selected from the group consisting of oxides, hydroxides, and thermally-decomposable salts of metals of groups I, II, III, IV, and VI of the periodic table, at a temperature of 500°–1000° F. until reaction with hydroxyl groups in the silica-alumina is complete, produces an isomerization catalyst having high isomerization activity and resistance to sulfur poisoning. This process is also applicable to the preparation of high-surface-area index catalyst supports for use in other catalytic processes, such as hydrogenation, reforming, etc.

It is therefore one object of this invention to provide an improved process for the preparation of a highly active isomerization catalyst which is resistant to decline in activity resulting from sulfur or water in the feed.

Another object of this invention is to provide an improved process for the preparation of a high-surface-area index, refractory oxide gel having improved properties suitable for use as a catalyst or catalyst support.

Another object of this invention is to provide an improved process for the isomerization of n-hexane and n-pentane using a catalyst having high activity and resistance to sulfur poisoning.

A further object of this invention is to provide an improved isomerization catalyst capable of effecting the isomerization of n-pentane and n-hexane to isoparaffins in high yield and which is resistant to sulfur poisoning.

A feature of this invention is the provision of a process for the preparation of a highly active isomerization catalyst in which a silica-alumina support is treated with a compound selected from the group consisting of oxides, hydroxides, and thermally-decomposable salts of metals of groups I, II, III, IV, and VI of the periodic table, at a temperature in the range from about 500°–1000°F. until reaction with hydroxyl groups in the silica-alumina is complete, followed by impregnation of the treated silica-alumina with a solution of a reducible palladium compound, and reduction of the impregnated catalyst with hydrogen at an elevated temperature to produce a highly active catalyst.

Another feature of this invention is the provision of an improved process for the preparation of a catalyst support of enhanced surface area index which comprises impregnating a predried metal oxide gel of the group consisting of alumina and silica-alumina with a small amount of a compound selected from the group consisting of oxides, hydroxides, and thermally-decomposable salts of metals of groups I, II, III, IV, and VI of the periodic table, at a temperature of about 500°–1000° F. until reaction with hydroxyl groups in the gel is complete.

Another feature of this invention is the provision of an improved process for the isomerization of n-pentane and n-hexane in which either or both of said hydrocarbons are passed with hydrogen at an elevated temperature and a temperature in the range of about 650°–800° F. over a catalyst consisting of 0.01–1.0% wt. palladium on silica-alumina, containing 50–95% silica, which catalyst has been treated with a compound selected from the group consisting of oxides, hydroxides, and thermally-decomposable salts of metals of groups I, II, III, IV, and VI of the periodic table, at a temperature of about 500°–1000° F. until reaction with the hydroxyl groups in the silica-alumina is complete.

Other objects and features of this invention will become apparent from time to time throughout the specification and claims as hereinafter related.

Metal oxides, including mixtures of metal oxides, are well known as catalysts and as supports in catalyst compositions containing various metals of groups V, VI, VII, and VIII of the periodic table. For example, silica-alumina is well known as a cracking catalyst, and as a support for metals, such as nickel, platinum, palladium, etc., for use in the hydrogenation, reforming, isomerization, etc., of hydrocarbons and mixtures thereof. Similarly, alumina and silica-alumina combinations are known as supports for cobalt and/or molybdenum, etc., for use in reforming or dehydrogenating hydrocarbon mixtures. Many of these prior art catalyst compositions undergo gradual loss of activity during prolonged use at elevated temperatures, probably because of a gradual degradation of the support structure, as by loss of structural water, or of the surface hydroxyl groups as water. Furthermore, many of these catalyst compositions undergo an activity decline caused by irreversible reaction of one or more of the catalyst constituents with sulfur compounds, by the deposition of sulfur-containing contaminants, or by the deposition of coke. In general, surface deposits consisting of sulfur-containing contaminants or coke can be burned from the catalyst, thereby revivifying it. However, activity loss caused by chemical association of one or more constituents with sulfur, and/or by destruction of the support structure, usually cannot be regained and the catalyst eventually must be removed and replaced. Because of the deleterious effect on certain reactions of even trace amounts of sulfur on some of these catalysts, a guard case usually is employed ahead of the reactor and feed stocks are carefully selected and prepared to prevent contact between the catalyst and even traces of sulfur. This of course is costly and is to be avoided, if possible.

It is known that silica gel, which has the theoretical surface structure,

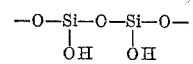

has a high surface area which is susceptible to modification or sintering at elevated temperatures. Alumina, silica-alumina, silica-zirconia, silica-magnesia, and other gel-derived solid oxide compositions are generally subject to similar deleterious effects.

I have found that these deleterious effects can be overcome by chemically reacting surface hydroxyls of the gels, at temperatures of about 500°–1000° F., with hydroxides, oxides, or thermally-decomposable salts of metals of groups I, II, III, IV, and VI of the periodic table, which are basic to the hydrogen atom in the hydroxyl groups of the hydrogel, or with salts of acids weaker than the hydrogen atoms of the gel hydroxyl groups, to form surface structures believed to be:

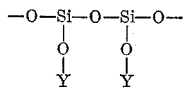

and

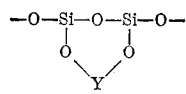

depending on the valence of the selected element (Y). The resulting compositions have greatly enhanced surface area indexes over conventionally-prepared oxide, or mixed oxide, hydrogel compositions, and are improved in thermal stability, sulfur resistance, and other properties desirable for catalysts or catalyst supports. These superior properties make the oxides which are so treated eminently suitable for catalysts in isomerization of hydrocarbons, in particular, but also applicable to catalytic cracking and other reactions.

In this invention, the primary emphasis and importance is placed on the application of my process to improve the characteristics, particularly the surface area, index of pre-dried alumina or silica-alumina hydrogels. This process is, however, applicable to other mixed oxides gels, such as silica-zirconia, silica-magnesia, etc. The improved catalyst compositions are prepared by reacting the hydroxyl groups of the gels with an oxide, hydroxide, or thermally-decomposable salt of the selected element. In general, any element capable of being deposited on the gel surfaces as an oxide or hydroxide basic to the hydrogen atom in the hydroxyl groups of the gel, or as a salt of an acid weaker than the hydrogen atoms of the gel hydroxyl groups, can be used. However, it appears that bivalent elements are most effective and the least likely to interject undesirable side-effects. The reaction with the surface hydroxyl is conducted at elevated temperatures of the order of 500°–1000° F., preferably of about 750°–975° F. at which temperature the reaction mass is maintained for a sufficient length of time to reach completion of reaction. Pressure does not appear to affect the process, but it is possible that it might be desirable in some instances to use superatmospheric pressures to prevent decomposition of a hydroxide before reaction. The success of this process depends upon the presence of a substantial number of reactive hydroxyl groups on or in the gel structure at the time the modifying compound is added. Consequently, it is essential that the gel has not been heated to a temperature prior to this treatment which is sufficient to drive off structural hydroxyl groups in the form of irreversible water. It is known that heating can drive off structural hydroxyl groups in the form of irreversible water, and that once driven off, the groups cannot be replaced. By way of illustration, I have found that little or no benefit is gained by treating a "catalyst-grade" silica gel which, in its preparation, has been calcined at about 1200° F. On the other hand, very substantial improvement is gained by treating a silica-alumina gel which has been spray-dried at an average bulk temperature of about 800° F. Because the effectiveness of this method is inversely proportional to the temperature to which the gel has been previously subjected, and to the extent to which structural hydroxyl groups have been removed as irreversible water, maximum benefit is gained in treating gels which have not been heated sufficiently to drive off any irreversible water. For example, I have found that irreversible water begins to be driven from silica-alumina gels at about 500° F. Consequently, it is preferred to treat silica-alumina hydrogels before they have been heated to temperatures in excess of about 500° F. It is noted, however, that some improvement is gained even in the case of gels which have been heated in the range from 500°–800° F.

In general, my process involves only the reaction of gel hydroxyl groups capable of reacting to form and eliminate water or an acid with the selected compound in accordance with the process which will be subsequently described. Consequently, the maximum amount of compound added is just sufficient to react with all surface hydroxyl groups. However, it is probable that less than the maximum reactive amount of compounds should be used in many instances where the catalytic effectiveness of the composition is primarily dependent on some degree of acidity. Thus, in certain cases, the amount to be added is only sufficient to gain the benefits of modification of surface area index of the gel without significantly diminishing the acidity of the gel. I have found that compounds in amounts as small as about 1% of the reactive maximum (although 10–40% is preferred) are effective in gaining increased surface area index and stabilization against sulfur poisoning.

In carrying out this invention, I have determined the maximum amount of the compound to be incorporated in the gel structure by ascertaining, through experiments, the amount of irreversible water lost by the gel when it is heated to the maximum temperature at which it is to be used or treated. Of course, the total amount of irreversible water removable from gel can be determined by completely sintering it, but this usually is neither needed nor desirable. Then, having determined the requisite amount of water, an amount of hydroxide, salt, oxide, from about 1–100% of the stoichiometric equivalent of the number of hydroxyl groups required to form that amount of water, is added. It can be seen that when the hydroxide or oxide of a monovalent element is used, the maximum number of molar equivalents is twice the number of mols of irreversible water formed on reaction. When a hydroxide or oxide of a divalent element is used, the maximum number of molar equivalents is equal to the number of mols of irreversible water. Because compounds of elements having valences greater than 2 usually can react with only 2 hydroxyl groups, the maximum number of molar equivalents of these elements usually is equal to the number of mols of irreversible water. It appears probable that the structures of certain gels will be such that more than two hydroxyl groups can combine with one mol of the compound, in which case fewer molar equivalents of the compound are used.

Specifically, with a hydroxide, or oxide, the number of hydroxyl groups capable of forming irreversible water by reaction with the surface hydroxyls of a particular gel, and the maximum amount of the element to be incorporated in accordance with this invention, can be readily determined. A quantity of the gel to be tested and treated is placed in a suitable vessel and dried to constant weight at a first elevated temperature by passing a stream of dry, inert gas through the bed. Then, the temperature is increased slowly to a higher fixed temperature while passing dry, inert gas through the bed, and when constant weight at higher temperature has been reached, the sample is isolated and weighed. The sample is then rehydrated at the first temperature by contact with a humidified inert gas, whereupon the weight increases to an equilibrium value. The gel is then heated in a dry gas stream at said first temperature and weighed after equilibrium is reached. The sequence is repeated, heating the gel incrementally to higher temperatures during each repetition, until a "critical" temperature is eventually reached at which the gel does not regain its weight fully upon rehumidification and drying at the next lower temperature. Thereafter, the gel is heated to the highest temperature at which the final catalyst composition is to be used and/or treated, and is both rehydrated by contact with humidified inert gas and dehydrated by contact with dry inert gas at said "critical" temperature. The difference between the final weight and the initial weight at the "critical" temperature is the amount of irreversible water removed from the sample by heating it to the maximum temperature. From the quantity of irreversible water removed, it is simple to calculate the number of hydroxyl groups which produced this quantity of water and which are therefore available for reaction with a metal oxide, hydroxide, or other metal compound in accordance with this invention.

In preparing catalyst supports or catalyst compositions in accordance with this invention, any method capable of bringing the hydroxide, oxide, or salt of the selected element into intimate contact with the surface hydroxyl groups in the gel may be used. For example, where the hydroxide, oxide, or salt of the element is water-soluble and reactive with the hydroxyls of the gel, the gel can be impregnated with an aqueous solution (or other solution) containing the requisite amount of the compound, using a volume of solution equivalent to the adsorptive capacity of the gel, after which the resulting wet mixture is dried and heated to 500°–1000° F., preferably 750°–975° F., until reaction is complete (completion of reaction is evidenced by cessation of evolution of water or acid). A lower limit of 500° F. is specified for the temperature range because it is at this temperature that the surface hydroxyl groups become activated for reaction and for elimination of water. In cases where the reactive oxides, hydroxides, or salts of the selected elements are unstable or insoluble in water, the gel is slurried into an aqueous solution containing the requisite amount of a water-soluble salt (unreactive with the surface hydroxyls) of the selected elements, and ammonia or other base is added to precipitate the hydroxide or oxide of the element on the gel surfaces. Then, the slurry is filtered, the filter cake is dried at about 230° F., and the dried filter cake is heated to 500°–1000° F., preferably about 750°–975° F., until reaction is complete, as evidenced by cessation of evolution of water. In general, the latter method is preferred even when certain oxides, hydroxides, or reactive salts of the selected elements are soluble, because of the superior distribution and intimacy of contact gained between the precipitate (solvents other than water may be used, e.g., methanol) from the compound and the gel surfaces.

The utility of this invention in increasing the surface area index of a commercial silica-alumina cracking catalyst has been demonstrated experimentally. First, the irreversible water content of a cracking catalyst was determined as above-described. This catalyst was a silica-alumina hydrogel which had been spray-dried at an average temperature of about 800° F. The irreversible water content was found to be 3.46 g. or 0.192 mol per 100 g. of catalyst. This, of course, is equal to 0.384 mol of hydroxyl groups available for reaction in the catalyst. The catalyst contained 75% wt. silica and 25% wt. alumina, had been initially calcined at about 800° F., and just prior to use had been dried at about 400° F. Portions of the catalyst were then treated further in accordance with this invention, as described in the following examples.

Example I

A solution of 1.2 g. of lithium hydroxide (0.05 mol of lithium, or 13% of the stoichiometric requirement) was added to 100 g. of the above-described silica-alumina catalyst. Then the resulting mixture was dried for about 20 hours at 230° F., leaving the lithium hydroxide on the gel surfaces. It was then heated for 6 hours at 975° F. until reaction was complete. The finished composition contained 0.35% lithium. Before addition of lithium, the silica-alumina catalyst had a surface area index of 280 $m.^2/g.$ The chemical incorporation of lithium in accordance with this invention increased the surface area index to 353 $m.^2/g.$ The surface area indexes of the support were determined by the Aromatic Adsorption Index Technique (described in A.P.I. Proceedings, vol. 27 (III), 1947, pp. 38–46) which gives a dimensionless relative surface measurement which is convertible to a surface area index in square meters per gram.

Example II

A 100-g. portion of the dried cracking catalyst, as used in Example I, was slurried into a solution of 4.7 g. of beryllium nitrate trihydrate and 200 cc. of water. This amount of beryllium nitrate trihydrate contained 0.025 mol of beryllium, or 13% of the stoichiometric requirement for reaction with reactive hydroxyls in the catalyst. To the slurry was added 100 cc. of a solution containing 3.4 cc. of 28% ammonium hydroxide in water. The mixture was agitated while adding the ammonium hydroxide solution and for ½ hour thereafter. The the slurry was filtered, and the filter cake was dried for about 20 hours at 230° F.

One half of the dried material was reacted at 750° F. for 6 hours. The surface area index of the finished product was 407 $m.^2/g.$ The other half of the dried material was reacted at 975° F. for 6 hours. The surface area index of this product was 368 $m.^2/g.$ (compared to 280 $m.^2/g.$ for the untreated catalyst).

Example III

A solution of 49.1 g. of beryllium nitrate trihydrate (0.262 mol of beryllium, or 39% of the stoichiometric requirement) in 350 cc. of water was added to a 350-g. portion of the dried silica-alumina used in Example I, with constant mixing. The mixture was dried for about 20 hours at 230° F. Then, a portion of the dried material was reacted for 6 hours at 975° F. The resulting product had a surface area index of 452 $m.^2/g.$

Example IV

A 100-g. portion of the dried silica-alumina of Example I was slurried into a solution of 6.4 g. of magnesium nitrate hexahydrate (0.025 mol of magnesium, or 13% of the stoichiometric requirement) in 200 cc. of water. A 100-cc. portion of solution containing 3.4 cc. of 28% ammonium hydroxide in water was then added to the slurry with agitation, and agitation was continued for ½ hour after the addition was completed. The slurry was filtered and the wet mass was dried for about 20 hours at 230° F. The dried catalyst was then reacted for 6 hours at 975° F. The finished product, containing 0.61% wt. combined magnesium, had a surface area index of 342 $m.^2/g.$

Example V

A solution of 1.0 g. of boric acid (0.016 mol boron, or 8.3% of the stoichiometric requirement) in 100 cc. of water was added to 100 g. of the silica-alumina as used in Example I. The mixture was dried for about 20 hours at 230° F. and the dried mass was reacted for 6 hours at 975° F. The resulting catalyst composition, having a boron content of 0.18% wt., had a surface area index of 342 $m.^2/g.$

Example VI

A 100-g. portion of the silica-alumina catalyst of Example I was slurried into a solution of 3.3 g. of zirconyl nitrate dihydrate (0.012 mol zirconium, or 6.2% of the stoichiometric requirement) in 200 cc. of water. Then 100 cc. of an aqueous solution containing 3.4 cc. of 28% ammonium hydroxide was added, with constant agitation continued for an additional ½-hour period. The resulting slurry was filtered and the filter cake was dried for about 20 hours at about 230° F. The catalyst material was then reacted at 975° F. for 6 hours. The resulting catalyst composition, containing 1.41% wt. zirconium, had a surface area index of 378 $m.^2/g.$

Example VII

When a catalyst support prepared in accordance with this invention, particularly in accordance with Examples I to VI, is impregnated with a solution of a palladium compound to produce a palladium content of about 0.3–0.8% wt. (preferably 0.65% wt.) and activated by reduction with hydrogen at 750°–975° F., there is obtained a catalyst having a high activity for isomerization of n-pentane and n-hexane and which is highly resistant to sulfur poisoning.

A solution of 35.0 g. of beryllium nitrate trihydrate (0.188 mol beryllium, or 39% of the stoichiometric requirement) in 250 cc. of water was added, with mixing, to 250 g. of 75/25 silica-alumina as used in Example I. The mixture was dried at 230° F. for 18 hours and was reacted at 975° F. for 6 hours. Then the resulting product was impregnated (with mixing) with a solution of 10.0 g. of 50% hydrofluoric acid in 250 cc. of water, dried at 230° F. for 18 hours, and impregnated (with mixing) with a solution of 3.0 g. of palladium nitrate in 250 cc. of water. The resulting catalyst composition was dried at 230° F. for 18 hours, formed into pellets, and activated by reduction with hydrogen at 750°–975° F.

For purposes of comparison, a portion of the palladium-containing catalyst prepared above was tested in the isomerization of n-pentane, and results were compared with the results obtained using catalysts based on silica-alumina supports which were not treated in accordance with this invention. A mixture of hydrogen and a hydrocarbon feed, consisting of about 97% vol. n-pentane, 2% vol. cyclopentane, and 1% vol. hexane, containing 5 ppm. sulfur, as dimethyl sulfide, was passed over the catalyst under isomerization conditions. The isomerization reaction was carried out at a temperature of 755° F. and total pressure of 580 p.s.i.g. The mol ratio of hydrogen/hydrocarbon was 2.5, and the liquid weight hourly space velocity of reactants was 9.0–9.2. Isopentane was obtained in an initial yield of 39.5%. At the end of 39 hours on stream, the isopentane yield was 35.3%. At the end of another 48 hours on stream, the isopentane yield was 35.7%. From this run, it is seen that this catalyst is stable and resistant to sulfur poisoning for extended periods of time.

In another experiment, hydrogen and a hydrocarbon feed consisting of 90% vol. n-pentane, 5% vol. cyclopentane, and 5% vol. hexane, containing 2 ppm. sulfur, in a hydrogen/hydrocarbon mol ratio of 2.9, were passed over an isomerization catalyst containing an untreated support, under isomerization conditions. The catalyst consisted of 0.65% wt. palladium on 87/13 silica-alumina, prepared by impregnating 87/13 silica-alumina (which had been dried at 400° F.) with an aqueous solution of 2.7 g. of palladium chloride and 35.7 g. of concentrated hydrochloric acid in 320 cc. of water, followed by drying at 230° F., and reduction with hydrogen at 750°–800° F. The reaction was carried out at a temperature of 780° F., pressure of 490 p.s.i.g., and liquid volume hourly space velocity of 4.7. The initial yield of isopentane was 33.3%, which declined to a value of 9.2% after 69 hours on stream.

In another experiment, a mixture of hydrogen and a hydrocarbon feed, consisting of 98% vol. n-pentane, and 2% vol. cyclopentane, in a hydrogen/hydrocarbon mol ratio of 2.2, were passed over a catalyst consisting of 0.4% wt. palladium on 87/13 silica-alumina. The isomerization reaction was carried out at a temperature of 770° F., a pressure of 600 p.s.i.g., and liquid volume hourly space velocity of 3.50. The initial isomerization yield was 50.4% and declined to 40.6% in only 16 hours.

*Example VIII*

In another experiment, a 250-g. portion of an 87/13 commercial silica-alumina catalyst (dried at 400° F. for 3 hours) was impregnated with 250 cc. of an aqueous solution containing 5.2 g. of beryllium nitrate trihydrate. The impregnated catalyst support was dried overnight at about 230° F., and then calcined for 6 hours at 975° F. until reaction with surface hydroxyls in the gel was complete. After calcination, the silica-alumina was impregnated with 250 cc. of an aqueous solution containing 4.2 g. of palladium nitrate and dried for about 18 hours at 230° F. The resulting catalyst was mixed with 1% graphite, formed into ⅛″ pellets, and activated by reduction with hydrogen at 750°–975° F.

A portion of the catalyst was used in the isomerization of technical-grade n-pentane (98% n-pentane and 2% cyclopentane) at a temperature of 750° F., total pressure of 520 p.s.i.g., hydrogen/hydrocarbon mol ratio of 1.3, and liquid weight hourly space velocity of 25. Under these conditions, the reaction rate constant K for the catalyst was 9.7. The activity of this catalyst is expressed in terms of the reaction rate constant K for purposes of comparison. The reaction rate constant K is a pseudo first-order reaction rate constant and is expressed by the formula:

$$K = (\text{LWHSV}) \ln \left[ \frac{1}{1 - \frac{x}{62}} \right]$$

where LWHSV is the liquid weight hourly space velocity and $x$ is the percent isopentane yield. A portion of the catalyst was exposed to a 75/25 hydrogen sulfide-hydrogen gas mixture for 125 minutes at 750° F., with a subsequent hydrogen purge for 10 hours. After cooling, the catalyst was again evaluated under the same isomerization reaction conditions and the rate constant K was found to be 8.7. The decline in activity of the catalyst under this severe treatment is not statistically significant. A similar catalyst prepared from an untreated silica-alumina support and subjected to the same hydrogen sulfide treatment suffered a 30% decline in initial activity, while in an aging test, an activity decline of 12.4% yield units per 100 hours on stream was observed with a technical-grade n-pentane feed containing 4 p.p.m. sulfur.

*Example IX*

A 250-g. portion of 75/25 silica-alumina (dried for 3 hours at 400° F.) was impregnated with 250 cc. of an aqueous solution containing 5.2 g. of beryllium nitrate trihydrate. The impregnated silica-alumina was dried for about 18 hours at 230° F. and heated for 6 hours at 975° F. to effect reaction between the beryllium and hydroxyl groups in the gel. The calcined silica-alumina was impregnated with 320 cc. of a solution containing 4.2 g. of palladium nitrate and 10.3 g. of 50% aqueous hydrofluoric acid, and dried overnight at 230° F. The resulting catalyst was mixed with 1% graphite and formed into ⅛″ pellets and activated by reduction with hydrogen at 750°–975° F. A portion of this catalyst was evaluated in the isomerization of technical-grade n-pentane under the conditions of Example VIII and found to have a reaction rate constant of 23. After treatment with a hydrogen sulfide-hydrogen gas mixture, as in Example VIII, there was no decline in activity of the catalyst. A portion of this catalyst was used in the isomerization of technical-grade n-pentane containing 5 p.p.m. sulfur at 765° F., 600 p.s.i.g., hydrogen/hydrocarbon ratio of 2.3, and liquid weight hourly space velocity of 5. This catalyst did not decline in activity during a 125-hour run.

*Example X*

A 250-g. portion of 75/25 silica-alumina (dried for 3 hours at 400° F.) was impregnated with 250 cc. of aqueous solution containing 4.8 g. of chromium nitrate nonahydrate and dried overnight at 230° F. The impregnated silica-alumina was heated for 4 hours at 975° F. to effect complete reaction with surface hydroxyls in the gel. The silica-alumina was then treated with 320 cc. of aqueous solution containing 2.7 g. of palladium chloride, 10.0 g. of 50% aqueous hydrofluoric acid, and 10 cc. of concentrated hydrochloric acid. The resulting catalyst was dried for 18 hours at 230° F. This catalyst was mixed with 1% graphite, formed into ⅛″ pellets, and activated by reduction with hydrogen at 750°–975° F.

When a portion of this catalyst was evaluated in the isomerization of technical-grade n-pentane under the conditions of Examples IX and X, a rate constant K of about 24 was determined. After treatment with a hydrogen/hydrogen sulfide gaseous mixture as in Examples IX and X, there was no significant decline in catalyst activity.

A portion of the catalyst was evaluated in an extended run using technical-grade n-pentane, containing 5 p.p.m. sulfur, at a temperature of 755° F., a total pressure of 580 p.s.i.g., hydrogen/hydrocarbon ratio of 2.5, and liquid weight hourly space velocity of 6. At the end of 165 hours on stream, there was no significant decline in catalyst activity. A similar catalyst, prepared from an untreated support, was evaluated with technical-grade n-pentane containing 5 p.p.m. sulfur at 755° F., 580 p.s.i.g., hydrogen/hydrocarbon ratio of 2.5, and liquid weight hourly space velocity of 8. This catalyst declined in activity at 5.8% yield units per 100 hours on stream.

From the foregoing experiments, it is seen that the presence of a very minute amount of sulfur in the hydrocarbon feed results in a very substantial decline in catalyst activity where the catalyst support is an untreated silica-alumina. However, when the catalyst support is prepared in accordance with this invention, the resulting catalyst is resistant to sulfur poisoning over extended periods of time. Catalysts prepared in accordance with this invention have also been found to have an unexpected resistance to decline in activity resulting from contact with water vapor. The improvement in resistance to sulfur poisoning is obtained for isomerization catalysts which are not fluorided with hydrofluoric acid, as well as for fluorided catalysts. While the hydrofluoric-acid treatment of the support may be given either before or after incorporating the structure-modifying element into the support in accordance with this invention, there is some evidence to indicate that a more active and more sulfur-resistant catalyst is obtained when the hydrofluoric-acid treatment is given to the support prior to reaction with the modifying element.

From the foregoing examples, it is seen that I have discovered a new and improved method for the preparation of a catalyst support of enhanced surface area index which is particularly useful in the preparation of isomerization catalysts which are resistant to sulfur aging, and which are useful in a novel isomerization process in which the catalyst does not decline substantially in activity as a result of sulfur poisoning. In accordance with this invention, the catalyst support, comprising a refractory metal oxide gel of the group consisting of alumina and silica-alumina, is predried and impregnated with 1–100% of the stoichiometric amount of a compound selected from the group consisting of oxides, hydroxides, and thermally-decomposable salts of metals of groups I, II, III, IV, and VI of the periodic table, required to react with hydroxyl groups in the gel. The impregnated gel is heated to a temperature of about 500°–1000° F. until reaction with the hydroxyl groups in the gel is complete as evidenced by cessation of evolution of water or acid vapors. This treatment effects a very substantial increase in surface area index of the catalyst support. When the catalyst support, treated as just described, is a silica-alumina containing 70–90% wt. silica, a highly active isomerization catalyst can be prepared by impregnating the treated support with a solution of a palladium compound to produce a palladium content of 0.3–0.8% wt. (either with or without added hydrofluoric acid), followed by activation of the catalyst by reduction with hydrogen at 750°–975° F. When the catalyst support is treated with a 1–5% solution of hydrofluoric acid, either prior to or subsequent to the surface-modifying treatment, there is obtained a catalyst of substantially higher isomerization activity. When isomerization catalysts prepared as just described are used in the isomerization of n-pentane and/or n-hexane at a temperature of about 700°–790° F., pressure of 100–1000 p.s.i.g., liquid volume hourly space velocity of 0.5–25.0, and hydrogen/hydrocarbon mol ratio of about 0.5–5.0, very substantial yields of isopentane and/or isohexane are obtained without decline in catalyst activity due to the presence of trace amounts of sulfur. When catalysts prepared in this manner are used in the isomerization process, the catalysts are highly resistant to sulfur contents in the range from zero to 10 p.p.m. Catalysts which have not received this treatment decline very substantially in activity upon extended exposure to feeds having sulfur contents in excess of about 1.0 p.p.m.

While I have described my invention fully and completely with special emphasis upon several preferred embodiments of the invention, I wish it to be understood that within the scope of the appended claims this invention may be practiced otherwise than as specifically described.

The embodiments of the invention in which an exclusive property or privilege is claimed are defined as follows.

I claim:

1. A method of preparing an isomerization catalyst resistant to sulfur-aging which comprises impregnating a predried silica-alumina support containing 70–90% silica, with 1–100% of the stoichiometric amount of a compound selected from the group consisting of oxides, hydroxides, and nitrates of chromium and beryllium required to react with the hydroxyl groups in the silica-alumina, heating the impregnated support to a temperature of about 500°–1000° F. until reaction with the hydroxyl groups is complete, as evidenced by cessation of evolution of reaction products, impregnating the support with a solution of a palladium compound to a palladium content of 0.3–0.8% wt., and activating the catalyst by reduction with hydrogen at 750°–975° F.

2. A method according to claim 1 in which the metal compound is beryllium nitrate.

3. A method according to claim 1 in which the metal compound is chromium nitrate.

4. A method according to claim 1 in which the catalyst support is treated with a 1–5% solution of hydrofluoric acid.

5. A method of isomerizing $C_5$–$C_6$ normal paraffin hydrocarbons without substantial decline in yield resulting from sulfur compounds in the feed, which comprises passing hydrogen and normal $C_5$–$C_6$ paraffin hydrocarbon containing 0–10 p.p.m. sulfur, at a temperature of 700°–790° F., sufficient to effect isomerization, a pressure of 100–1000 p.s.i.g., and a hydrogen/hydrocarbon mol ratio of about 0.5–5.0, over a catalyst prepared by impregnating a predried silica-alumina support, containing 70–90% silica, with 1–100% of the stoichiometric amount of a compound selected from the group consisting of oxides, hydroxides, and nitrates of chromium and beryllium required to react with the hydroxyl groups in the silica-alumina, heating the impregnated support to 500°–1000° F. until reaction with the hydroxyl groups is complete, as evidenced by cessation of evolution of reaction products, impregnating the support with a solution of a palladium compound to a palladium content of 0.3–0.8% wt., and activating the catalyst by reduction with hydrogen at 750°–975° F.

6. A method according to claim 5 in which the metal compound is beryllium nitrate.

7. A method according to claim 5 in which the metal compound is chromium nitrate.

8. A method according to claim 5 in which the catalyst support is treated with a 1–5% solution of hydrofluoric acid.

(References on following page)

References Cited in the file of this patent

UNITED STATES PATENTS

| | | |
|---|---|---|
| 2,387,596 | Marisic | Oct. 23, 1945 |
| 2,469,420 | Thacker | May 10, 1949 |
| 2,480,627 | Bodkin et al. | Aug. 30, 1949 |
| 2,651,598 | Ciapetta | Sept. 8, 1953 |
| 2,779,742 | Emmett | Jan. 29, 1957 |
| 2,818,451 | Myers | Dec. 31, 1957 |
| 2,867,578 | Hirschler | Jan. 6, 1959 |
| 2,898,305 | Teter et al. | Aug. 4, 1959 |
| 2,918,509 | Miller et al. | Dec. 22, 1959 |
| 2,924,628 | Donaldson | Feb. 9, 1960 |
| 2,924,629 | Donaldson | Feb. 9, 1960 |